United States Patent
Klamka et al.

(10) Patent No.: US 6,220,546 B1
(45) Date of Patent: Apr. 24, 2001

(54) AIRCRAFT ENGINE AND ASSOCIATED AIRCRAFT ENGINE COWL

(75) Inventors: Andrew Klamka, Wichita, KS (US); Dean Leon Parham, Carnation, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/474,741

(22) Filed: Dec. 29, 1999

(51) Int. Cl.[7] .............................. B64C 1/14; B64D 27/00
(52) U.S. Cl. ................................. 244/129.4; 244/129.5; 244/54
(58) Field of Search .................... 244/54, 129.4, 244/53 R, 53 B, 129.5; 137/15.1

(56) References Cited

U.S. PATENT DOCUMENTS

| | | | |
|---|---|---|---|
| 2,763,900 | * 9/1956 | McAfee et al. | 244/129.5 |
| 4,044,973 | 8/1977 | Moorehead | 244/54 |
| 4,442,987 | 4/1984 | Legrand et al. | 244/110 B |
| 4,585,189 | 4/1986 | Buxton | 244/54 |
| 4,679,750 | 7/1987 | Burhans | 244/129.4 |
| 4,697,763 | 10/1987 | Vermilye | 244/129.4 |
| 4,720,065 | 1/1988 | Hamatani | 244/129.5 |
| 5,035,379 | 7/1991 | Hersen et al. | 244/129.4 |
| 5,203,525 | 4/1993 | Remlaoui | 244/129.4 |
| 5,350,136 | 9/1994 | Prosser et al. | 244/129.4 |
| 5,372,338 | 12/1994 | Carlin et al. | 244/54 |
| 5,497,961 | 3/1996 | Newton | 244/54 |
| 5,673,874 | * 10/1997 | Howard | 244/129.5 |
| 5,941,061 | * 8/1999 | Sherry et al. | 244/54 |
| 6,032,901 | * 3/2000 | Carimali et al. | 244/129.4 |

* cited by examiner

Primary Examiner—Charles T. Jordan
Assistant Examiner—Christian M. Best
(74) Attorney, Agent, or Firm—Alston & Bird LLP

(57) ABSTRACT

An aircraft engine has opposite front and rear ends, extends in a longitudinal direction between the front and rear ends, and defines a longitudinal axis that extends between the front and rear ends. The aircraft engine includes a reference portion, and right and left cowls that extend arcuately at least partially around the longitudinal axis of the aircraft engine. The cowls are operative for covering at least a portion of the reference portion. Each cowl is movably mounted in relation to the reference portion so that the cowls move both radially away from the longitudinal axis and in the longitudinal direction as the cowls are moved from a closed configuration to an open configuration. Further, the cowls move both in the longitudinal direction and radially toward the longitudinal axis as the cowls are moved from the open configuration to the closed configuration.

17 Claims, 13 Drawing Sheets

AIRCRAFT ENGINE AND ASSOCIATED AIRCRAFT ENGINE COWL

FIELD OF THE INVENTION

The present invention relates to aircraft engine cowls and, more particularly, to attachment assemblies that moveably mount the fan cowls of a turbofan engine.

BACKGROUND OF THE INVENTION

Many different types of aircraft are propelled by turbofan engines. It is common for a turbofan engine to be connected to the fuselage or a wing of an aircraft by a pylon. Such a turbofan engine typically includes a nacelle that is a streamline enclosure that contains internal parts of the engine. A nacelle includes an inlet assembly that is positioned at the front of the turbofan engine, extends arcuately around the rotational axis of the engine, and defines an opening through which air is drawn into the engine. The nacelle further includes oppositely oriented right and left fan cowls that are immediately rearward of the inlet assembly and extend arcuately partially around the rotational axis of the engine. The fan cowls cover internal parts of the turbofan engine, such as a fan case and electrical components that control the operation of the engine. The fan cowls are operable to provide access to internal components of the turbofan engine, such as during maintenance of the engine.

Each of the fan cowls includes a horizontally extending top edge that is hinged so each fan cowl can be opened by pivoting the cowl upward about the hinge. It can be difficult to manually open the fan cowls because they must be lifted to facilitate the pivoting about their horizontal top edges. It can be particularly difficult to open the fan cowls of large turbofan engines because the cowls are large, bulky and may be heavy, and for some aircraft the cowls are positioned high above the ground and are therefore difficult to reach. Turbofan engines with heavy fan cowls are often equipped with powered door opening systems that are operative to automatically open the fan cowls. Such powered door opening systems add to the weight of the turbofan engine and thereby the weight of the associated aircraft, which can be disadvantageous. Further, when the above-described fan cowls are open they may catch wind in a manner that adds to the difficulty of opening and closing the cowls. In addition, components of nacelles must be designed to handle wind related loading that occurs when fan cowls of the above-described type are open.

Accordingly there is a need for an aircraft engine, such as a turbofan engine, with cowls, such as fan cowls, that are relatively easy to open and close.

SUMMARY OF THE INVENTION

The present invention solves the above and other problems by providing cowls, such as fan cowls, for a turbofan engine of an aircraft that can be placed in an open configuration by moving the cowls outward and then forward, and placed in a closed configuration by moving the cowls rearward and then inward. As such, the cowls are relatively easy to open and close.

In accordance with one aspect of the present invention, the aircraft engine has opposite front and rear ends, extends in a longitudinal direction between the front and rear ends, and defines a longitudinal axis that extends between the front and rear ends. The aircraft engine includes a reference portion, and each cowl extends arcuately at least partially around the longitudinal axis of the aircraft engine and is operative for covering at least a part of the reference portion while in the closed configuration. Each cowl is movably mounted in relation to the reference portion so that the cowls move both radially away from the longitudinal axis and in the longitudinal direction as the cowls are moved from the closed configuration to the open configuration. Further, the cowls move both in the longitudinal direction and radially toward the longitudinal axis as the cowls are moved from the open configuration to the closed configuration.

In accordance with another aspect of the present invention, the reference portion of the aircraft engine includes an inlet assembly that is positioned at the front of the aircraft engine. The inlet assembly includes an exterior surface that extends arcuately at least partially around the longitudinal axis of the aircraft engine. The cowls are generally rearward of the inlet assembly in the closed configuration. The cowls are movably mounted in relation to the inlet assembly so that the cowls move both radially away from the inlet assembly and forward in the longitudinal direction relative to the inlet assembly as the cowls are moved from the closed configuration to the open configuration, and that movement is reversed as the cowls are moved from the open configuration to the closed configuration.

In accordance with another aspect of the present invention, each cowl is movably mounted in relation to the reference portion of the aircraft engine by a respective pivot assembly that is operative so that the cowls pivot between the closed configuration and the open configuration. A representative pivot assembly for one of the cowls includes upper and lower arms, each of which has opposite first and second ends. The first end of the upper arm is pivotally mounted in relation to the reference portion of the aircraft engine for pivoting about a rotational axis, and the second end of the upper arm is pivotally mounted in relation to the cowl for pivoting about another rotational axis. Likewise, the first end of the lower arm is pivotally mounted in relation to the reference portion of the aircraft engine for pivoting about a rotational axis, and the second end of the lower arm is pivotally mounted in relation to the cowl for pivoting about another rotational axis. The rotational axes of the first end of the upper arm, the second end of the upper arm, the first end of the second arm, and second end of the lower arm generally parallel. The rotational axis of the first end of the lower arm is radially farther from the longitudinal axis than the rotational axis of the first end of the upper arm, and the rotational axes of the first end of the lower arm and the first end of the upper arm are spaced apart from one another in the longitudinal direction. Likewise, the rotational axis of the second end of the lower arm is radially farther from the longitudinal axis than the rotational axis of the second end of the upper arm, and the rotational axes of the second end of the lower arm and the second end of the first arm are spaced apart from one another in the longitudinal direction.

In accordance with another aspect of the present invention, the arms are curved in a manner that enhances the extent to which the second ends of the upper and lower arms are capable of moving forward of the first ends of the upper and lower arms during the open configuration.

Because the cowls are opened by moving them outward and then forward, or the like, and closed by moving them rearward and then inward, or the like, the cowls are advantageously relatively easy to manually open and close.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
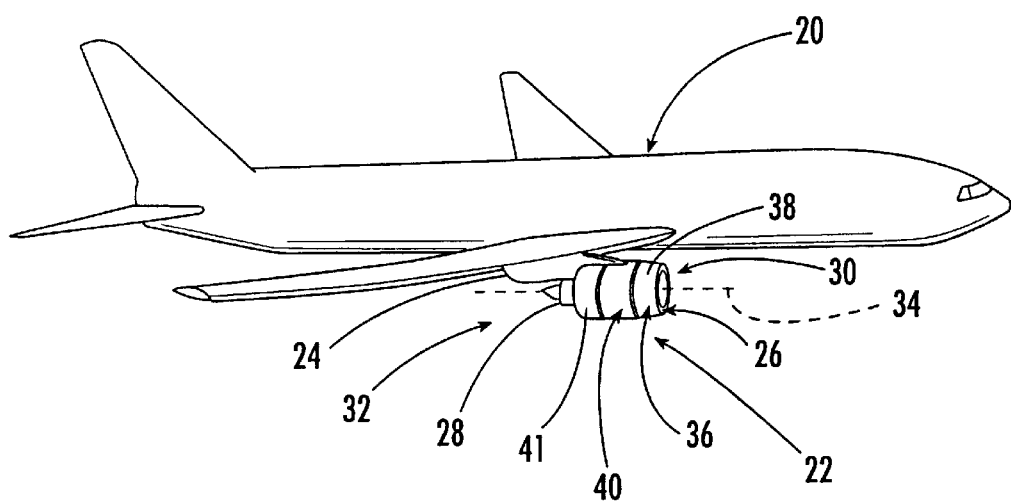
FIG. 1 is a perspective view of an aircraft that is propelled by a turbofan engine incorporating improved fan cowls, in accordance with one advantageous embodiment of the present invention.

FIG. 1 illustrates an aircraft 20 that is propelled by a turbofan engine 22 that is mounted to a wing of the aircraft by a pylon 24, in accordance with one embodiment of the present invention. Whereas the aircraft 20 illustrated in FIG. 1 includes two turbofan engines 22, the present invention has applicability to aircraft having other numbers of turbofan engines. The turbofan engine 22 illustrated in FIG. 1 includes a nacelle 26 that is a streamline enclosure for internal components of the turbofan engine. In accordance with one advantageous embodiment of the present invention, the nacelle 26 includes a fan cowl 40 having opposite right and left sides that can be easily opened and closed. The sides of the fan cowl 40 are opened by moving them outward and then forward, or the like, and closed by moving them rearward and then inward, or the like, as will be discussed in greater detail below. These outward, forward, rearward, and inward movements are relatively easy to facilitate in comparison to the lifting and lowering movements required for opening and closing at least some types of conventional fan cowls.

The internal components of the turbofan engine 22 that are at least partially enclosed by the streamline nacelle 26 include what can be characterized as a turbojet 28 (a majority of which is hidden from view in FIG. 1) and a fan (not shown) connected to the front of the turbojet. The internal components of the turbofan engine 22 can be characterized as a frame of reference, or a reference portion of the turbofan engine, with respect to which the opposite sides of the fan cowl 40 are movably mounted. The turbofan engine 22 includes a front end 30 and an opposite rear end 32. The turbofan engine 22 defines a longitudinal axis 34 that extends in a longitudinal direction between the front and rear ends 30, 32 and is coaxial with the rotational axes of the turbofan engine's fan, compressor and turbine, all of which are hidden from view in FIG. 1.

The nacelle 26 further includes an inlet assembly 36 having an exterior surface 38 that extends arcuately around the longitudinal axis 34. The fan cowl 40 is rearward of the inlet assembly 36 and extends arcuately around the longitudinal axis 34. The nacelle further includes a thrust reversal cowl 41 that is rearward of the fan cowl 40 and extends arcuately around the longitudinal axis 34. The aircraft 20 and turbofan engine 22 are conventional, except for the fan cowl 40 and the attachment assemblies that cooperate with the fan cowl to allow for the opening and closing of the fan cowl, as will be discussed in greater detail below.

Figure 2:
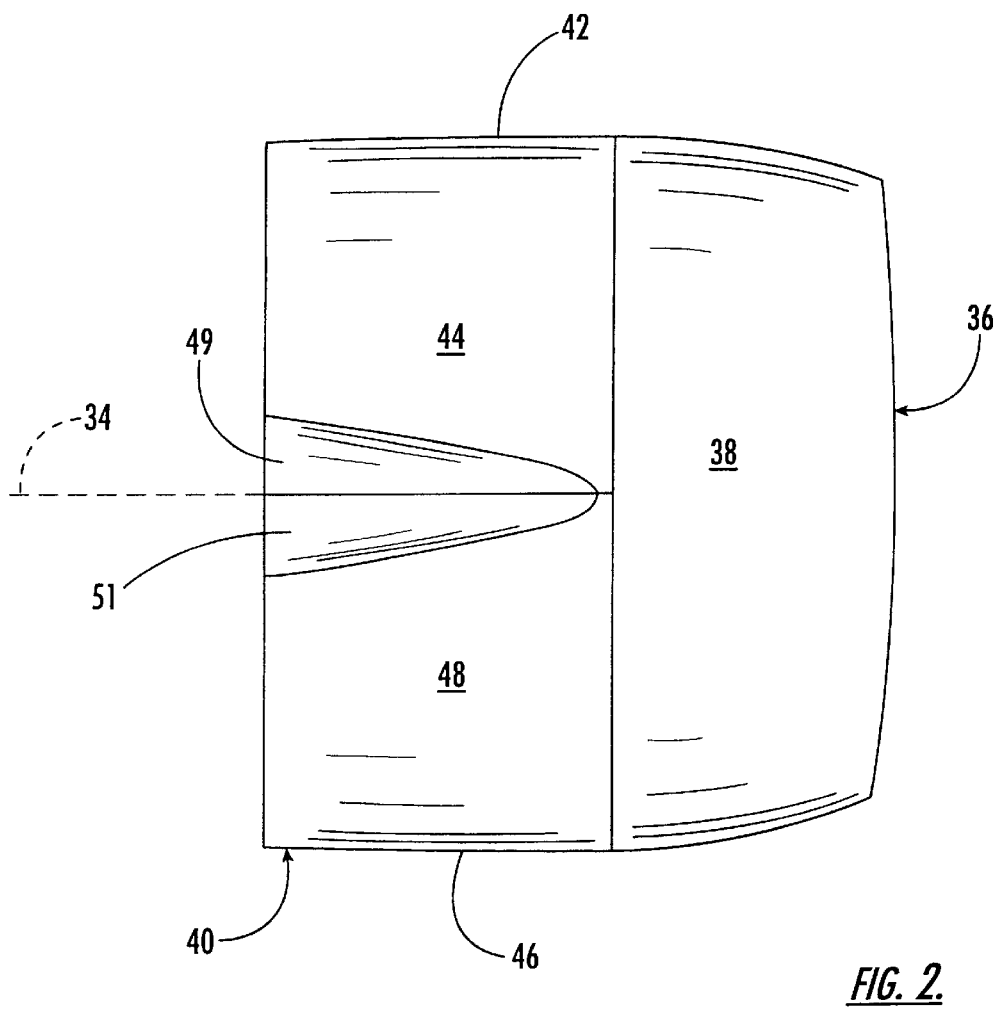
FIG. 2 is a top plan view of the fan cowls and an inlet assembly of the turbofan engine illustrated in FIG. 1, with the fan cowls in a closed configuration.

FIG. 2 is a top plan view of the inlet assembly 36 and the fan cowl 40 in a closed configuration. The left side of the fan cowl 40 is a left fan cowl or left cowl 42 having an exterior surface 44, and the right side of the fan cowl is a right fan cowl or right cowl 46 having an exterior surface 48. The portions of the exterior surfaces 44, 48 of the right and left cowls 42, 46 and the exterior surface 38 of the inlet assembly 36 that are contiguous are flush with one another while the fan cowl 40 is in the closed configuration. As a result, the drag force asserted on the nacelle 26 (FIG. 1) while the aircraft 20 (FIG. 1) is in flight is not inordinately compromised by the cowl 40 of the present invention. Further, excrescence drag is controlled because a left forward strut fairing 49 is incorporated into the left cowl 42, and a right forward strut fairing 51 is incorporated into the right cowl 46.

Figure 3:
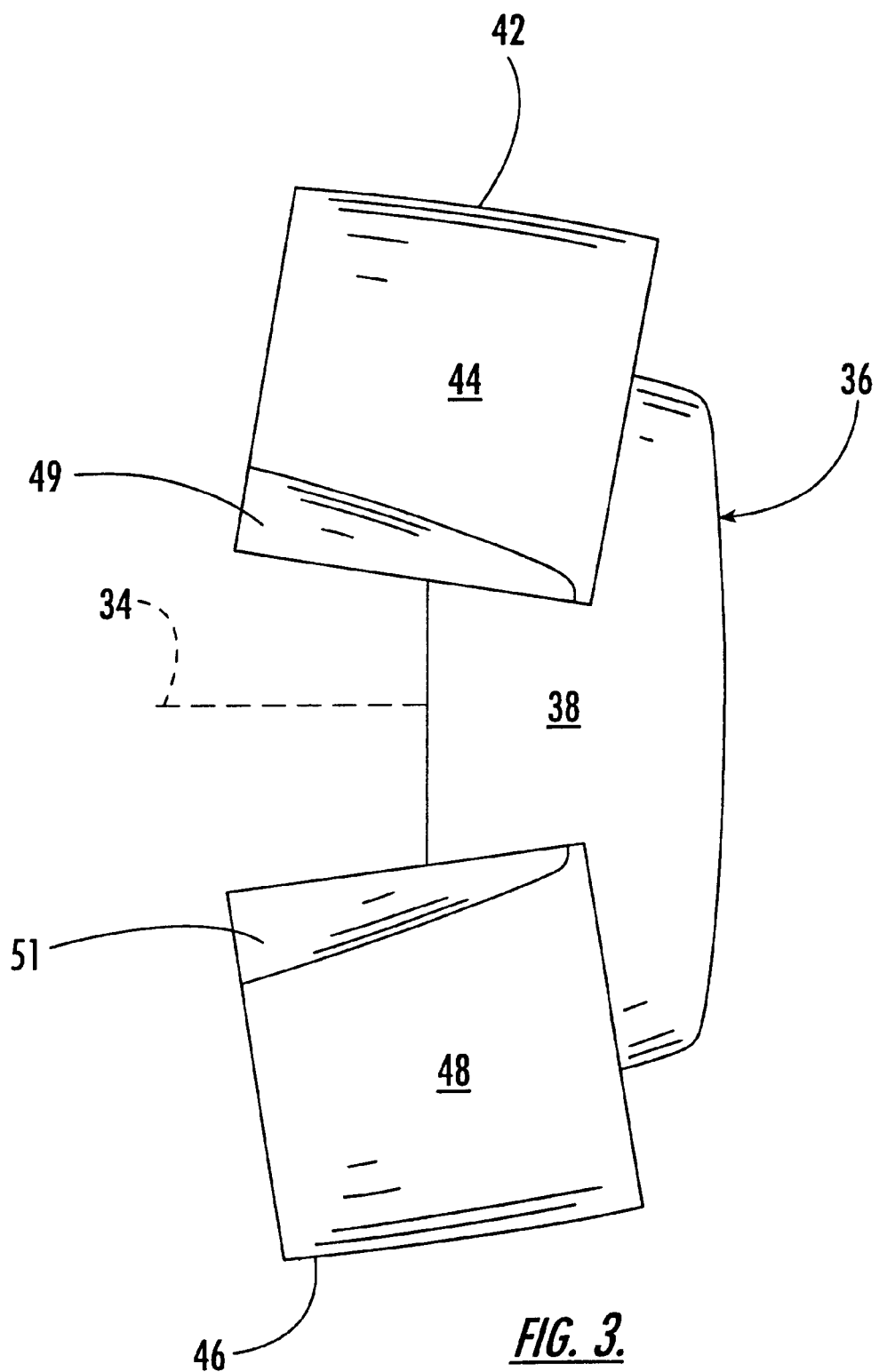
FIG. 3 is a top plan view of the fan cowls and inlet assembly of FIG. 2, with the fan cowls is an open configuration.

FIG. 3 is a top plan view of the inlet assembly 36 and the fan cowl 40 in an open configuration. The left cowl 42 is generally to the left of the inlet assembly 36 and the right cowl 46 is generally to the right of the inlet assembly 36 during the open configuration.

Figure 4:
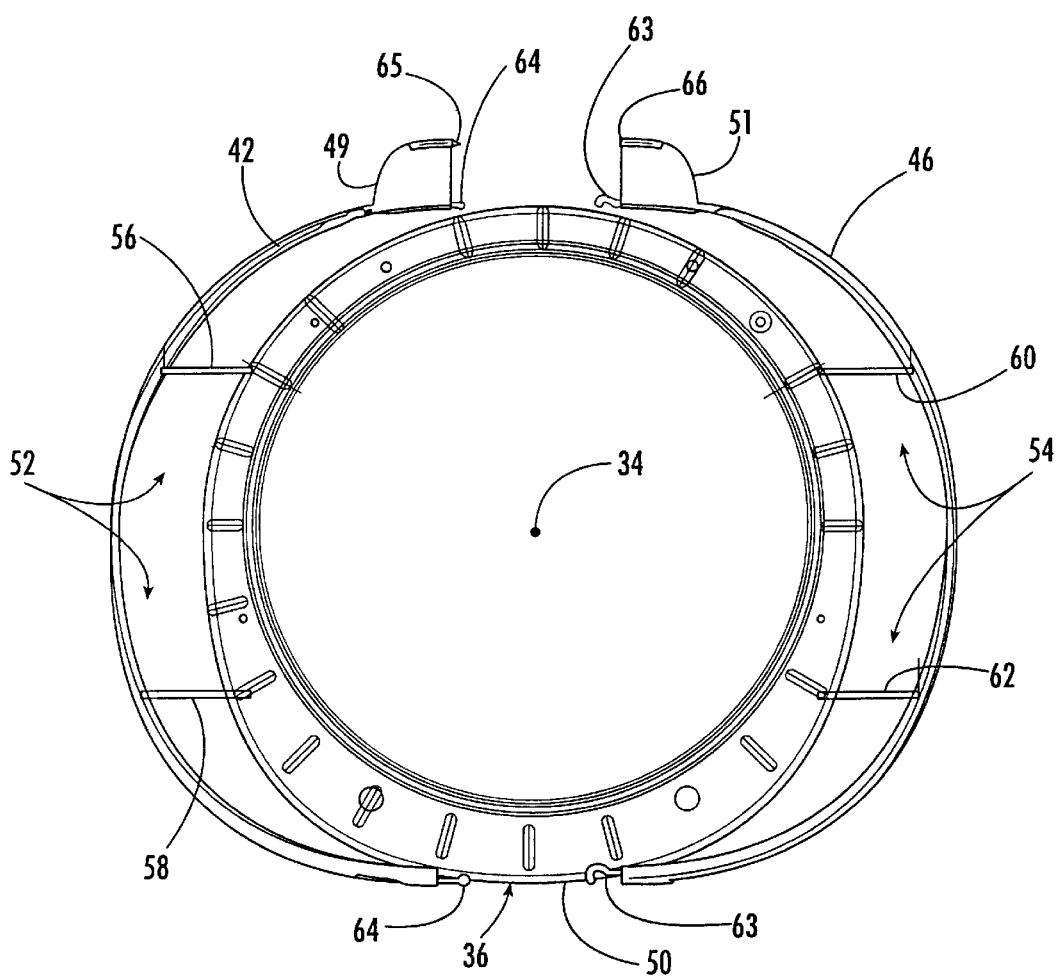
FIG. 4 is a schematic rear elevation view of the fan cowls and inlet assembly of FIG. 2 in the open configuration.

FIG. 4 is a schematic rear elevation view of the inlet assembly 36 and the fan cowl 40 in the open configuration. As illustrated in FIG. 4, the inlet assembly 36 further includes an aft inlet bulkhead assembly 50 that extends arcuately around the longitudinal axis 34. The inlet assembly 36 and the aft inlet bulkhead assembly 50 can be characterized as being part of the reference portion of the turbofan engine 22 because the fan cowl 40 moves relative thereto.

In accordance with the illustrated embodiment of the present invention, the movement of the left and right cowls 42, 46 is enabled by left and right attachment assemblies 52, 54, respectively. The left attachment assembly 52 includes upper and lower left arms 56, 58, each of which has opposite ends. One of the ends of the upper left arm 56 is mounted in pivotal relation to the inlet assembly 36, and the other end of the upper left arm is mounted in pivotal relation to the left cowl 42. Likewise, one of the ends of the lower left arm 58 is mounted in pivotal relation to the inlet assembly 36, and the other end of the lower left arm is mounted in pivotal relation to the left cowl 42. The right attachment assembly 54 includes upper and lower right arms 60, 62, each of which includes opposite ends. One of the ends of the upper right arm 60 is mounted in pivotal relation to the inlet assembly 36, and the other end of the upper right arm is mounted in pivotal relation to the right cowl 46. Likewise, one of the ends of the lower right arm 62 is mounted in pivotal relation to the inlet assembly 36, and the other end of the lower right arm is mounted in pivotal relation to the right cowl 46.

In accordance with the illustrated embodiment of the present invention, the fan cowl 40 includes a releasable latching mechanism that is operative to releasably hold the fan cowl 40 in the closed configuration. As illustrated in FIG. 4, the releasable latching mechanism includes a pair of latches 63 that are connected to and extend from the right cowl 46 and releasably latch onto respective keepers 64 that are connected to and extend from the left cowl 42. As illustrated in FIG. 4, the fan cowl 40 further includes an alignment mechanism having a male portion 65 that is connected to the left cowl 42 and a female portion 66 that is connected to or defined by the right cowl 46 and receives the male portion in the closed configuration. That is, the upper longitudinally extending edges of the cowls 42, 46 abut one another in the closed configuration. In addition, the lower longitudinally extending edges of the cowls 42, 46 abut one another in the closed configuration.

Figure 5:
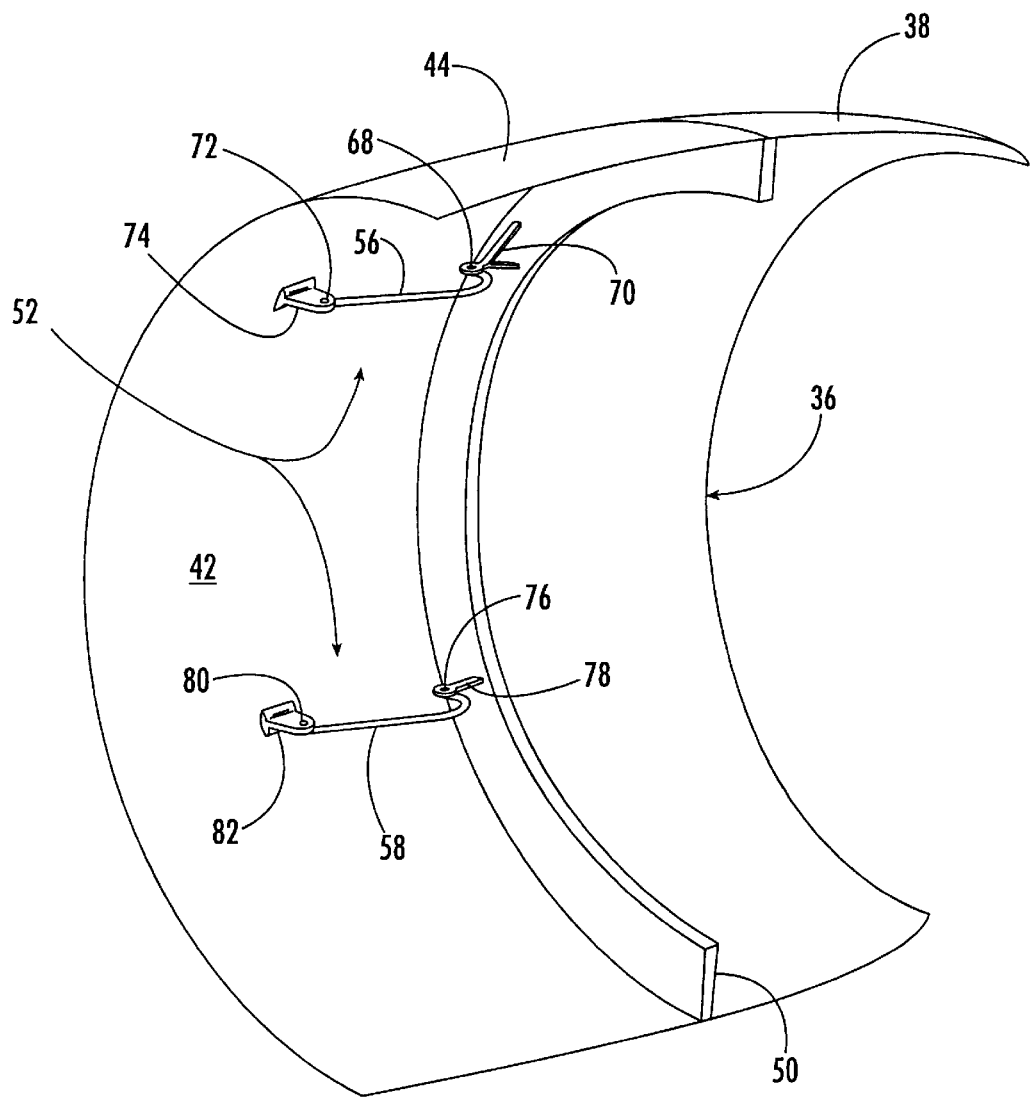
FIG. 5 is a schematic internal perspective view of the left fan cowl and the left half of the inlet assembly of FIG. 2, in the closed configuration.

FIG. 5 is a schematic internal perspective view of a portion of the inlet assembly 36 and the left cowl 42 in the closed configuration. The left attachment assembly 52 and the right attachment assembly 54 (FIG. 4) are generally identical, except that they are reversed from one another; therefore, the following discussion of the left attachment assembly is generally representative of the right attachment assembly. Nonetheless, it is within the scope of the present invention for a turbofan engine 22 (FIG. 1) to be equipped with solely the left cowl 42 and associated left attachment assembly 52 or solely the right cowl 46 (FIG. 4) and the associated right attachment assembly 54 (FIG. 4).

As best seen in FIG. 5, one of the ends of the upper left arm 56 is pivotally connected by an upper front pivot pin 68 to an upper front bracket 70 that is mounted to the aft inlet bulkhead assembly 50, so the upper left arm can pivot about a vertically extending upper front axis. The opposite end of the upper left arm 56 is pivotally connected by a upper rear pivot pin 72 to a upper rear bracket 74 that is mounted to the left cowl 42, so the upper left arm can pivot about a vertically extending upper rear axis. Likewise, one of the ends of the lower left arm 58 is pivotally connected by a lower front pivot pin 76 to a lower front bracket 78 that is mounted to the aft inlet bulkhead assembly 50, so the lower left arm can pivot about a vertically extending lower front axis. The opposite end of the lower left arm 58 is pivotally connected by a lower rear pivot pin 80 to a lower rear bracket 82 that is mounted to the left cowl 42, so the lower left arm can pivot about a vertically extending lower rear axis.

FIGS. 6–13 are schematic top plan views of portions of the left cowl 42, the inlet assembly 36, and the left attachment assembly 52. As best seen in FIGS. 6–13, in accordance with the illustrated embodiment of the present invention, the upper front axis defined by the upper front pivot pin 68, the upper rear axis defined by the upper rear pivot pin 72, the lower front axis defined by the lower front pivot pin 76, and the lower rear axis defined by the lower rear pivot pin 80 are all parallel with respect to one another, and they are offset with respect to one another to facilitate the preferred movement of the left cowl 42 between the open and closed configurations. More specifically, the lower front pivot pin 76 is radially farther from the longitudinal axis 34 than the upper front pivot pin 68, and the lower front pivot pin 76 is spaced apart from the upper front pivot pin 68 in the longitudinal direction. Likewise, the lower rear pivot pin 80 is radially farther from the longitudinal axis 34 than the upper rear pivot pin 72, and the lower rear pivot pin 80 is spaced apart from the upper rear pivot pin 72 in the longitudinal direction.

Figure 6:
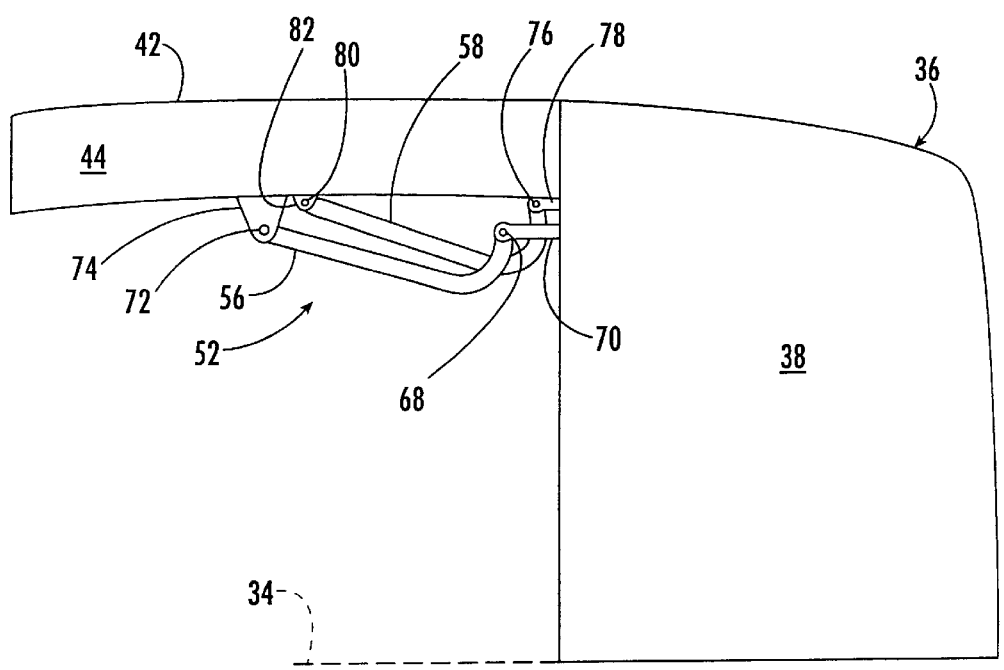
FIGS. 6–13 are schematic top plan views of portions of the left fan cowl and the left half of the inlet assembly of FIG. 2, wherein the left fan cowl is illustrated in the closed configuration in FIG. 6 and the open configuration in FIG. 13, and FIGS. 7–12 illustrate a sequential series of configurations between the closed and open configurations.
Figure 7:
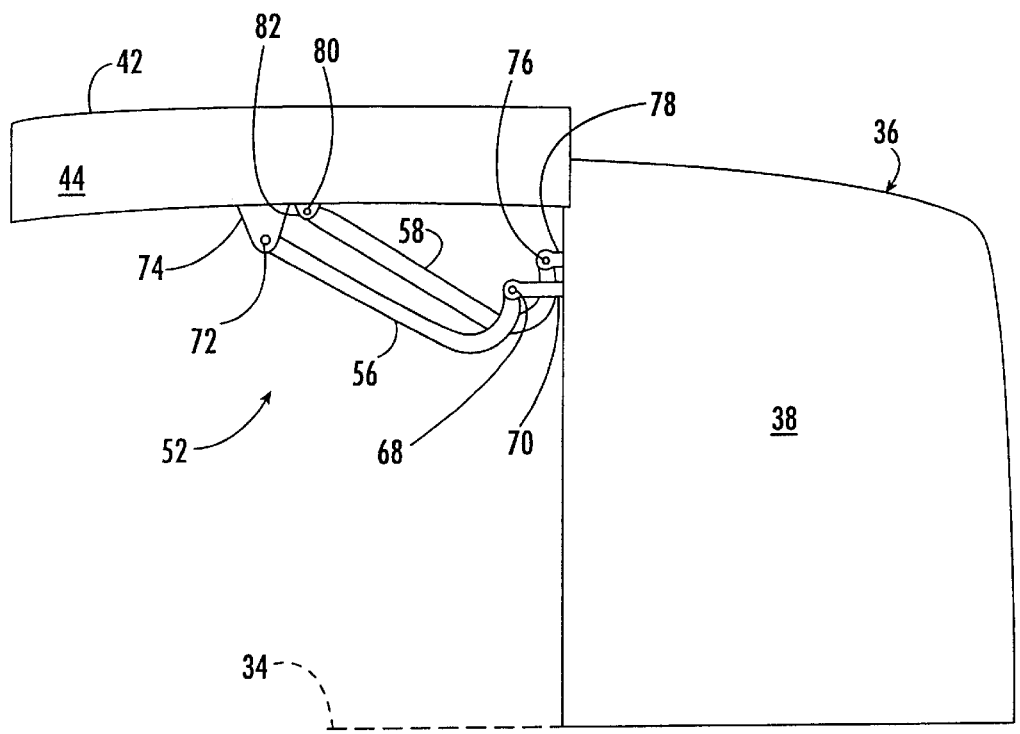
Figure 8:
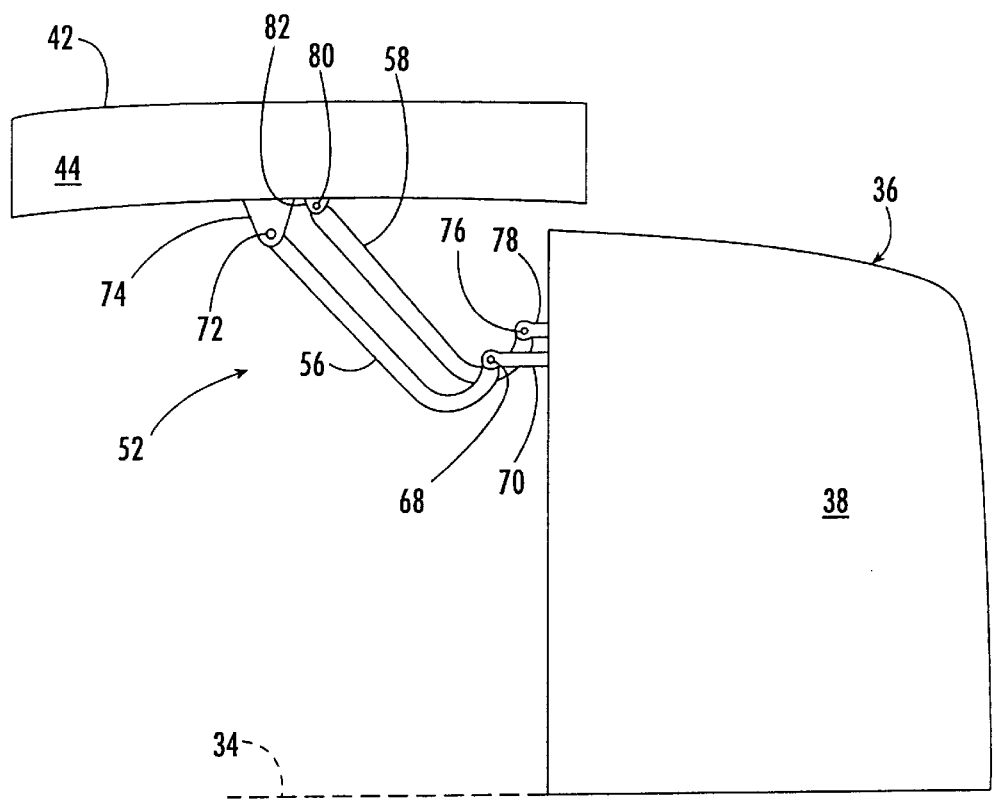
Figure 9:
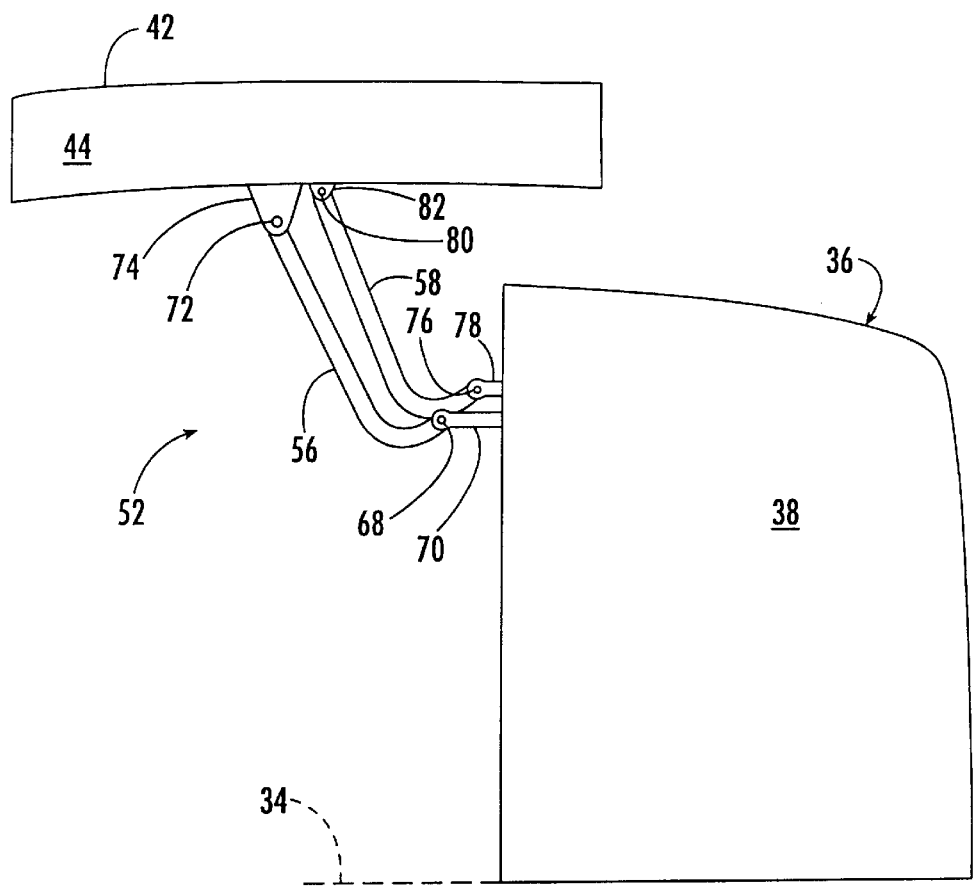
Figure 10:
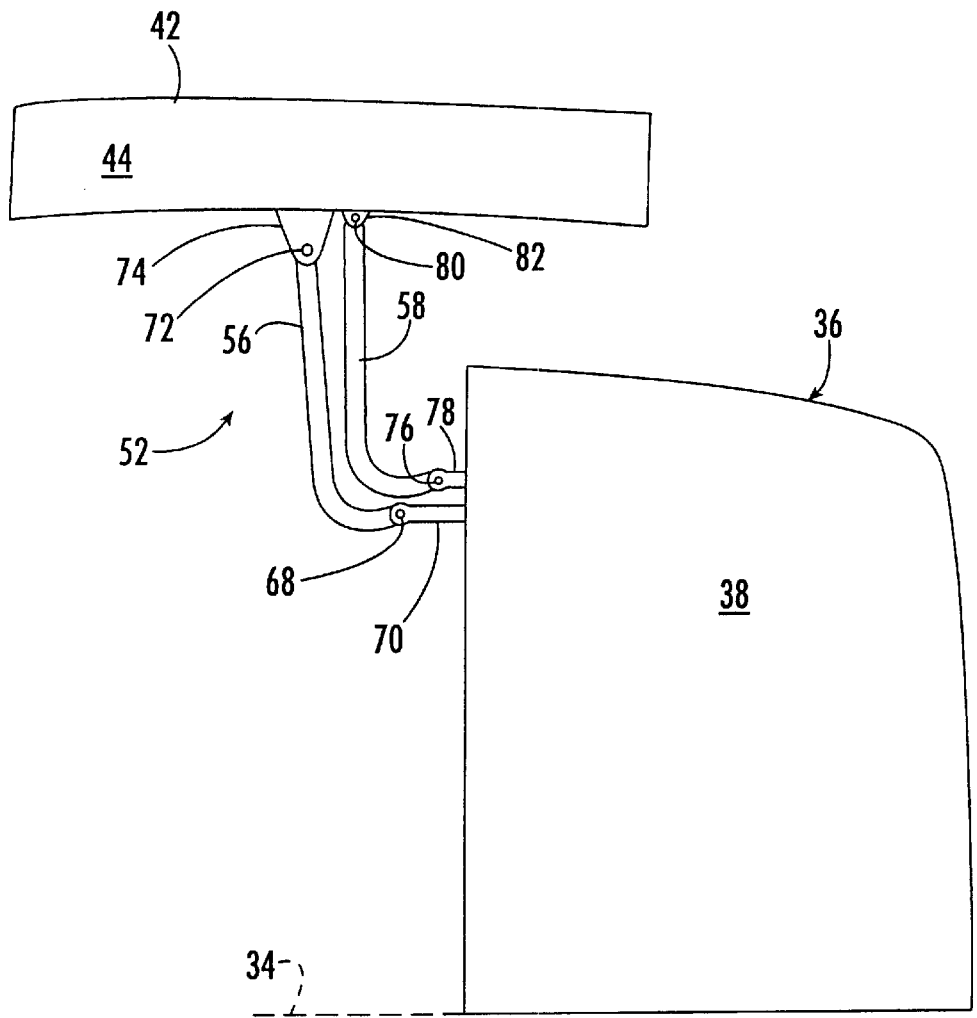
Figure 11:
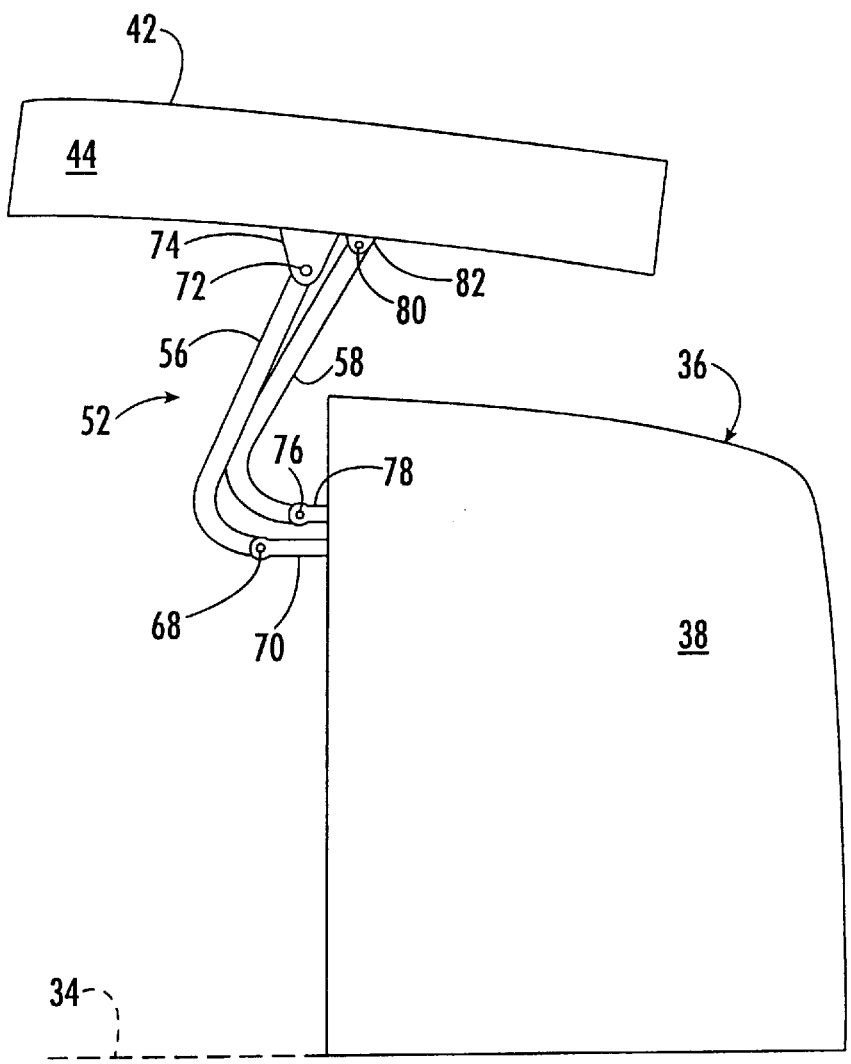
Figure 12:
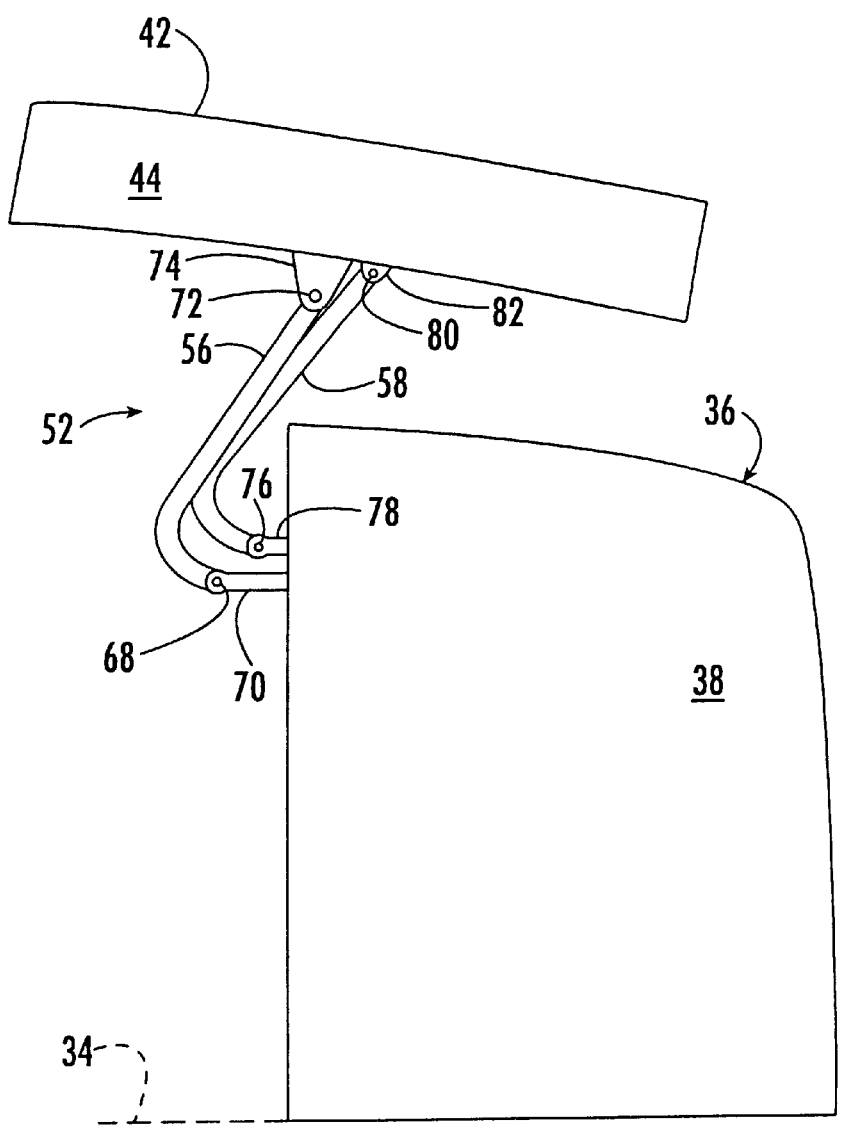
Figure 13:
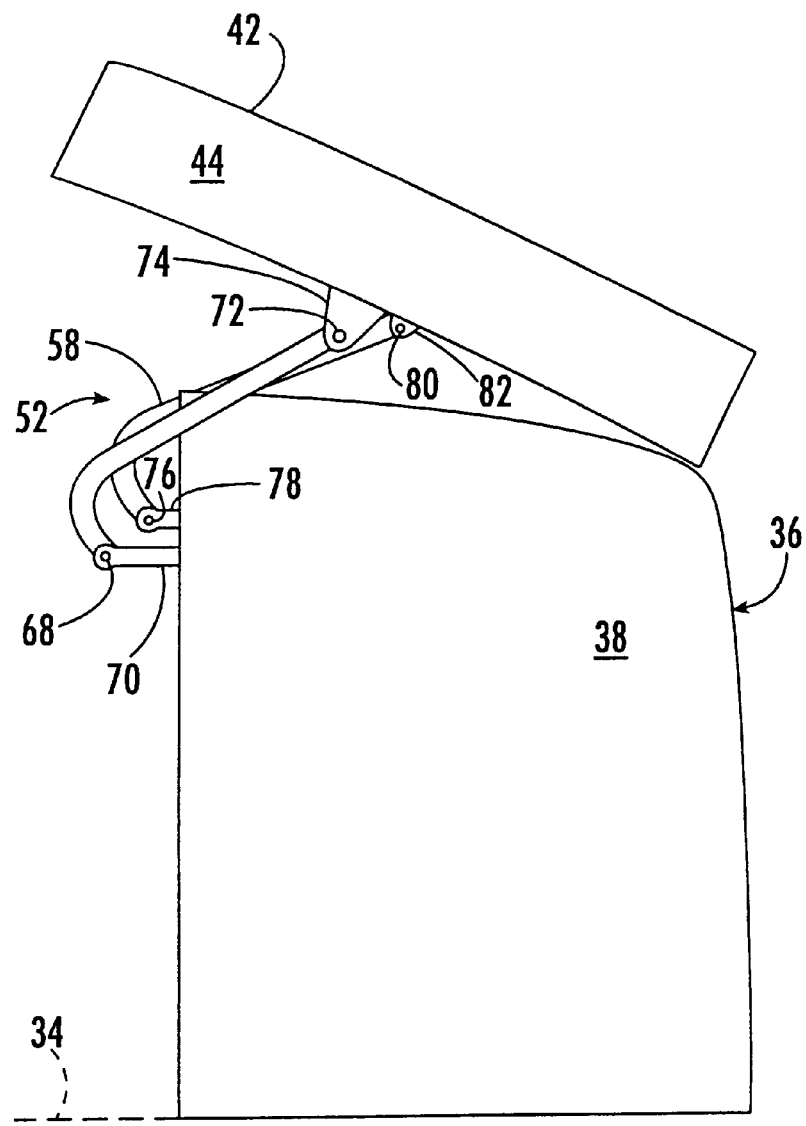

The left cowl 42 is illustrated in the closed configuration in FIG. 6 and the open configuration in FIG. 13. FIGS. 7–12 illustrate a sequential series of intermediate configurations between the closed and open configurations. Whereas only six different intermediate configurations are illustrated, there is a continuum of intermediate configurations. It is preferred for the intermediate configurations to be quickly passed through as the left cowl 42 is moved from the closed to open configuration and from the open to closed configuration.

As is apparent from FIG. 6, the left cowl 42 is generally rearward of the inlet assembly 36 in the closed configuration. As apparent from FIGS. 6–13, the left attachment assembly 52 is operative so that the left cowl 42 initially moves generally radially away from the longitudinal axis 34 and inlet assembly 36, and thereafter the left cowl moves forward relative to the inlet assembly as the left cowl is moved from the closed configuration to the open configuration. As best seen in FIG. 13, the arms 56, 58 are curved so that the rear pivot pins 72, 80 are forward of at least a portion of the inlet assembly 36 in the open configuration. That is, the arms 56, 58 are curved so that the left cowl 42 is sufficiently forward in the open configuration to provide access to the components of the turbofan engine 22 (FIG. 1) that are covered by the left cowl while the left cowl is in the closed configuration.

Because the cowls 42, 46 (FIGS. 2–4) are opened by moving them outward and then forward, or the like, and closed by moving them rearward and then inward, or the like, the cowls are advantageously relatively easy to open and close because minimal or no lifting of the cowls is required.

Many modifications and other embodiments of the invention will come to mind to one skilled in the art to which this invention pertains having the benefit of the teachings presented in the foregoing descriptions and the associated drawings. For example, whereas the present invention has been described in the context of the turbofan engine 22 (FIG. 1), those of ordinary skill in the art will appreciate that the present invention has applicability to many different types of aircraft engine cowls. In addition, in accordance with an alternative embodiment of the present invention, the cowls 42, 46 (FIGS. 2–4) are opened by moving them outward and then rearward, and closed by moving them forward and then inward.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An aircraft engine having opposite front and rear ends and having a longitudinal axis that extends between the front and rear ends, the aircraft engine comprising:
    an inlet assembly positioned at the front of the aircraft engine and comprising an exterior surface that extends arcuately at least partially around the longitudinal axis of the aircraft engine;
    right and left cowls, each of which respectively comprises an exterior surface that extends arcuately at least partially around the longitudinal axis of the aircraft engine;
    a right attachment assembly operative so:
       the right cowl is movably mounted in relation to the inlet assembly,
       the right cowl is capable of being moved between a closed configuration and an open configuration, wherein the right cowl is generally rearward of the inlet assembly and proximate portions of the exterior surface of the right cowl and the exterior surface of the inlet assembly are generally flush while the right cowl is in the closed configuration, and the right cowl is generally to the right of the inlet assembly while the right cowl is in the open configuration, and the right cowl moves both radially away from the longitudinal axis and forward as the right cowl is moved from the closed configuration to the open configuration; and a left attachment assembly operative so:

the left cowl is movably mounted in relation to the inlet assembly, the left cowl is capable of being moved between a closed configuration and an open configuration, wherein the left cowl is generally rearward of the inlet assembly and proximate portions of the exterior surface of the left cowl and the exterior surface of the inlet assembly are generally flush while the left cowl is in the closed configuration, and the left cowl is generally to the left of the inlet assembly while the left cowl is in the open configuration, and the left cowl moves both radially away from the longitudinal axis and forward as the left cowl is moved from the closed configuration to the open configuration.

2. An aircraft engine according to claim 1, wherein:

the right attachment assembly comprises:

an upper right arm having opposite ends, wherein one end of the upper right arm is mounted in pivotal relation to the right cowl to define a first rotational axis, and the other end of the upper right arm is mounted in pivotal relation to the inlet assembly to define a second rotational axis, and a lower right arm that is positioned lower than the upper right arm and has opposite ends, wherein one end of the lower right arm is mounted in pivotal relation to the right cowl to define a third rotational axis, and the other end of the lower right arm is mounted in pivotal relation to the inlet assembly to define a fourth rotational axis, and wherein the rotational axes of the upper right arm are offset from the rotation axes of the lower right arm; and the left attachment assembly comprises:

an upper left arm having opposite ends, wherein one end of the upper left arm of the left attachment assembly is mounted in pivotal relation to the left cowl to define a fifth rotational axis, and the other end of the upper left arm of the left attachment assembly is mounted in pivotal relation to the inlet assembly to define a sixth rotational axis, and a lower left arm having opposite ends, wherein one end of the lower left arm of the left attachment assembly is mounted in pivotal relation to the left cowl to define a seventh rotational axis, and the other end of the lower left arm of the left attachment assembly is mounted in pivotal relation to the inlet assembly to define an eighth rotational axis, and wherein the rotational axes of the upper left arm of the left attachment assembly are offset from the rotation axes of the lower left arm of the left attachment assembly.

3. An aircraft engine according to claim 2, wherein:

the right arms are curved in a manner that enhances the degree to which the right cowl is capable of moving forward; and the left arms are curved in a manner that enhances the degree to which the left cowl is capable of moving forward.

4. An aircraft engine having opposite front and rear ends, extending in a longitudinal direction between the front and rear ends, and defining a longitudinal axis that extends between the front and rear ends, the aircraft engine comprising:

a reference portion;

a cowl that extends arcuately at least partially around the longitudinal axis of the aircraft engine and is operative for covering at least a portion of the reference portion while the cowl is in a close configuration, wherein the cowl is movably mounted in relation to the reference portion so:

the cowl is capable of being moved between the closed configuration and an open configuration, and the cowl moves both radially away from the longitudinal axis and in the longitudinal direction as the cowl is moved from the closed configuration to the open configuration.

5. An aircraft engine according to claim 4, wherein the reference portion comprises an inlet assembly that is positioned proximate the front-end of the aircraft engine and comprises an exterior surface that extends arcuately at least partially around the longitudinal axis of the aircraft engine, wherein the cowl is generally rearward of the inlet assembly in the closed configuration, and the cowl is movably mounted in relation to the reference portion so that the cowl moves both radially away from the inlet assembly and forward relative to the inlet assembly as the cowl is moved from the closed configuration to the open configuration.

6. An aircraft engine according to claim 5, wherein:

the cowl is pivotally mounted in relation to the inlet assembly by an attachment assembly comprising an arm having opposite first and second ends;

the first end of the arm is pivotally mounted in relation to the inlet assembly at a position that is radially closer to the longitudinal axis than at least a portion of the exterior surface of the inlet assembly;

the second end of the arm is pivotally mounted in relation to the cowl;

the second end of the arm is rearward of the inlet assembly in the closed configuration; and the arm is curved so that the second end of the arm is forward of at least a portion of the inlet assembly in the open configuration.

7. An aircraft engine according to claim 4, wherein the cowl is movably mounted in relation to the reference portion by a pivot assembly that is operative so that the cowl pivots between the closed configuration and the open configuration.

8. An aircraft engine according to claim 7, wherein the reference portion comprises a bulkhead, and the pivot assembly is pivotally mounted in relation to the bulkhead.

9. An aircraft engine according to claim 7, wherein the pivot assembly comprises:

a first arm having opposite first and second ends, wherein the first end is pivotally mounted in relation to the reference portion for pivoting about a first rotational axis and the second end is pivotally mounted in relation to the cowl for pivoting about a second rotational axis; and a second arm having opposite first and second ends, wherein the first end of the second arm is pivotally mounted in relation to the reference portion for pivoting about a third rotational axis and the second end of the second arm is pivotally mounted in relation to the cowl for pivoting about a fourth rotational axis, and the first, second, third, and fourth rotational axes are generally parallel.

10. An aircraft engine according to claim 9, wherein:

the third rotational axis, which is associated with the first end of the second arm, is radially farther from the longitudinal axis than the first rotational axis, which is associated with the first end of the first arm;

the third rotational axis, which is associated with the first end of the second arm, and the first rotational axis, which is associated with the first end of the first arm, are spaced apart from one another in the longitudinal direction;

the fourth rotational axis, which is associated with the second end of the second arm, is radially farther from the longitudinal axis than the second rotational axis, which is associated with the second end of the first arm; and the fourth rotational axis, which is associated with the second end of the second arm, and the second rotational axis, which is associated with the second end of the first arm, are spaced apart from one another in the longitudinal direction.

11. An aircraft engine according to claim 10, wherein:

the third rotational axis, which is associated with the first end of the second arm, is forward of the first rotational axis, which is associated with the first end of the first arm; and the fourth rotational axis, which is associated with the second end of the second arm, is forward of the second rotational axis, which is associated with the second end of the first arm.

12. An aircraft engine according to claim 9, wherein the first arm is curved and the second arm is curved.

13. An aircraft engine according to claim 12, wherein:

the reference portion comprises an inlet assembly that is positioned at the front of the aircraft engine and comprises an exterior surface that extends arcuately at least partially around the longitudinal axis of the aircraft engine, and the cowl is generally rearward of the inlet assembly in the closed configuration;

the first and third rotational axes, which are respectively associated with the first end of the first arm and the first end of the second arm, are positioned radially closer to the longitudinal axis than at least a portion of the exterior surface of the inlet assembly;

the pivot assembly is operative so the cowl moves both radially away from the inlet assembly and forward relative to the inlet assembly as the cowl is moved from the closed configuration to the open configuration; and the curvature of the arms is such that the second and fourth rotational axes, which are respectively associated with the second end of the first arm and the second end of the second arm, are positioned forward of at least a portion of the inlet assembly in the open configuration.

14. An aircraft comprising:

a fuselage; and an aircraft engine operative for propelling the fuselage, wherein the aircraft engine has opposite front and rear ends, extends in a longitudinal direction between the front and rear ends, and defines a longitudinal axis that extends between the front and rear ends, and wherein the aircraft engine comprises:

a cowl that extends arcuately at least partially around the longitudinal axis and is operative for covering at least a reference portion of the aircraft engine; and an attachment assembly operative so:

the cowl is movably mounted in relation to the reference portion of the aircraft engine, the cowl is capable of being moved between a closed configuration and an open configuration, and the cowl moves both radially away from the longitudinal axis and in the longitudinal direction as the cowl is moved from the closed configuration to the open configuration.

15. An aircraft according to claim 14, wherein the attachment assembly comprises:

a first arm having opposite first and second ends, wherein the first end is pivotally mounted in relation to the reference portion of the aircraft engine for pivoting about a rotational axis, and the second end is pivotally mounted in relation to the cowl for pivoting about a rotational axis; and a second arm having opposite first and second ends, wherein the first end of the second arm is pivotally mounted in relation to the reference portion of the aircraft engine for pivoting about a rotational axis, and the second end of the second arm is pivotally mounted in relation to the cowl for pivoting about a rotational axis, and wherein the rotational axes of the first end of the first arm, the second end of the first arm, the first end of the second arm, and second end of the second arm generally parallel.

16. An aircraft according to claim 15, wherein:

the rotational axis of the first end of the second arm is radially farther from the longitudinal axis than the rotational axis of the first end of the first arm;

the rotational axes of the first end of the second arm and the first end of the first arm are spaced apart from one another in the longitudinal direction;

the rotational axis of the second end of the second arm is radially farther from the longitudinal axis than the rotational axis of the second end of the first arm; and the rotational axes of the second end of the second arm and the second end of the first arm are spaced apart from one another in the longitudinal direction.

17. An aircraft according to claim 16, wherein:

the rotational axis of the first end of the second arm is forward of the rotational axis of the first end of the first arm; and the rotational axis of the second end of the second arm is forward of the rotational axis of the second end of the first arm.

* * * * *